United States Patent Office 3,117,023
Patented Jan. 7, 1964

3,117,023
METHOD OF MAKING A NON-CORRODING
ELECTRODE
Charles E. Tirrell, Wayne, Pa., assignor to Ionics,
Incorporated, Cambridge, Mass., a corporation of
Massachusetts
No Drawing. Filed Jan. 3, 1962, Ser. No. 164,159
3 Claims. (Cl. 117—227)

This invention relates to the preparation of an inert electrode for use as the anode in electrodialysis or electrolytic systems of conductive solutions, and more particularly to a noble metal protected electrolytic valve metal of the group consisting of titanium, tantalum and columbium and method of producing the same whereby a very effective and economical anode electrode is obtained for use in the electrodialysis of naturally occurring waters and other electrolytic industrial solutions such as in caustic-chlorine cells. More specifically, platinum-protected tantalum, titanium or columbium prepared by the thermal reduction of a very thin film of a heat reducible platinum compound from a solution or liquid suspension thereof in a solvent upon a sheet of said base metal results in a very effective and stable anodic electrode in membrane demineralizers or electrolytic systems of naturally occurring waters and other electrolyte-containing solutions.

The invention has as an object the provision of a non-corrosive, stable and inexpensive anode. A further object is the provision of a process for preparing such an electrode. Still another object is the process of electrodialysis of conductive solutions especially in the production of caustic and chlorine from sodium chloride solutions wherein the anodic electrode employed is stable and non-corrosive in the presence of reaction products of said electrolysis. Other objects will appear hereinafter.

Naturally occurring waters such as brackish, hard, and sea waters and other industrial solutions contain varying quantities of salts such as chlorides, sulfates, bicarbonates, carbonates and small quantities of nitrates, fluorides, etc. When a direct current is passed through such waters, the products of electrolysis are usually strongly corrosive and exert a strong chemical attack on the electrode material necessitating careful selection of the composition of such electrodes. For example, graphite electrodes have been successfully used in solutions containing high concentrations of chloride anions because the carbon is sufficiently resistant to anodic chlorine gas for the anode to last many months. On the other hand, carbon electrodes are not nearly as valuable in sulfate-containing solutions owing to the generation of oxygen which attacks the carbon. In pure sulfate solutions, lead anodes may be used because a protective film of insoluble lead oxide forms at the surface of the electrode which nevertheless continues to conduct electricity. Furthermore, the formation of lead oxide ceases shortly after the start of an electrolysis. On the other hand, lead electrodes are not nearly as valuable in chloride-containing solutions because the chlorine gas which forms at the anode attacks the lead-forming soluble lead chloride which is not retained as a protective coating. Numerous materials have been tried out and found unsatisfactory for various reasons usually attributable to chemical reactions with electrolysis products.

The noble metal anodes, platinum, rhodium, iridium, osmium, and palladium have been successfully used as anodes in electrolytic cells. However, it is apparent that the cost of such electrodes, in any reasonable and necessary thickness, is so high as to become prohibitive for commercial use. Platinum is the preferred noble metal of this invention and will be referred to hereinafter as representative of this class of metals.

Accordingly, the present invention is directed to the application of a compound of a noble metal to the surface of base metals capable of forming a protective, insoluble, non-stripping coating thereon.

The electrolytic valve elements tantalum, titanium and columbium are much less expensive than the noble metals and have properties that make them corrosion-resistant to the anodic electrolysis product of natural and industrial waters. They are inert to acids, chlorides, wet or dry halogens at temperatures below 150° C., boiling aqua regia, and inert to practically all other compounds found in naturally occurring waters as well as other electrolytic solutions.

There are, however, some drawbacks in the use of these base metals as an electrode. For example, they are rapidly attacked by alkalies; in acid solutions, they form a protective oxide coating which is highly electrically resistant, etc. Thus, when said pure base metals are used as anodes in solutions, the current therethrough stops almost instantaneously due to the formation of this oxide film which is very tenacious. Because of this protective film, tantalum, titanium and columbium are useful support and conductor material for inert or noble metal coatings. However, attempts to electroplates a film of platinum on said base metals in a manner well known in the art to do not produce a film which is firmly bonded to the same and the platinum film may be "stripped" with too much ease from its metal base support.

While the electroplating of platinum upon tantalum has been disclosed in U.S. Patent No. 1,077,920, it is evident from the commercial literature (The Metal Tantalum, published by Fansteel Metallurgical Corporation, North Chicago, Illinois) that to avoid either stripping of the platinum coat because of poor bonding or rapid attack of the tantalum by cathodically evolved hydrogen, extremely close pH control is required. Furthermore, experimentally it was found that very low current densities were required to prevent hydrogen evolution and consequent tantalum embrittlement. At these very low densities, long periods of time are required for useful coats of platinum to be formed.

The above disadvantages are overcome by the present thermal reduction of a solution of platinum upon the base metals tantalum, titanium or columbium. In addition, the present invention combines the excellent anode properties of platinum with the much lower cost of tantalum, titanium, or columbium to produce effective, economical, and stable anodes for use in electrolytic and electrodialytic cells.

In the process of the present invention a thin layer of platinum, for example of the character of a millionth of an inch, is coated upon tantalum, titanium or columbium from a solution of a reducible platinum compound in a solvent therefor by painting or spraying a thin film of said platinum containing liquid on the tantalum, titanium, or columbium base and then firing the mass, in a gaseous reducing flame, at about 300 to 800° C. The heating of the mass is preferably effected in an oven at about 425° C. and preferably in a non-oxidizing atmosphere such as carbon monoxide, hydrogen, helium or argon. A very thin, somewhat permeable, coat of platinum on the base metal surface results. A thicker coating can be obtained, for example by repeating this process. Such a material when used as an anode functions by carrying the electric current through the base metal to the platinum film surface. In such surface areas as may be porous, the base metal forms the characteristic highly resistant oxide film which is very tenacious and protects the porous areas from further possible attack. The result is an active surface of platinum which can carry the entire anodic electrolytic current without significant attack in neutral or acid media and without stripping of said platinum from the base metal.

The reducible platinum solution may preferably be an aqueous solution of chloro-platinic acid with hydroxylamine hydrochloride as the reducing agent. Other reducing agents such as hydroxylamine sulfate, formic acid, formaldehyde, etc., are also effective. Other solutions of platinum such as the halides in organic solvents, known as "Platinum Bright," etc., may also be employed.

Other base metals such as Ni, Cu, Al, W, other electrolytic valve metals, etc. were similarly coated with the platinum liquid but the resulting platinum films produced were very porous and when employed as the anode electrode in membrane demineralizers for water, the base metals were immediately attacked by the products of electrolysis and rapidly deteriorated. The unique property of tantalum, titanium and columbium which under similar circumstances form a tenacious, protective film of metal oxide is the factor which is so desirable and successful in its use as the base-coated metal in the manner described above, in electrolytic cells and in membrane demineralizers for naturally occurring waters or other industrial solutions.

Although platinum is specifically referred to herein as the noble metal coating, it is understood that other well known noble metals, as for example referred to above, could be substituted therefor. As for the base metal, only tantalum, titanium and columbium have been found to be effective for the present invention.

The more detailed practice of the invention is illustrated by the following examples. There are, of course, many forms of the invention other than these specific embodiments.

Example 1

A sheet of tantalum was prepared for coating by sanding with No. 80 emery cloth the area to be subsequently platinized. The tantalum sheet was sanded with parallel strokes to roughen the surface evenly, and then the sanding was continued perpendicularly to the first sending. The sanded surface of tantalum was then cleaned and degreased by washing the same with soap and scouring powder. The cleaned tantalum was then rinsed with tap water followed by distilled water, and then air dried.

The platinizing solution was prepared as follows: Scrap platinum was cleaned by heating for 15 minutes in concentrated nitric acid, then thoroughly washed and dried. So 4 grams of this platinum-cleaned scrap, 70 ml. concentrated HCl, 10 ml. concentrated $HNO_3$ was added until the platinum dissolved. This solution was then evaporated to 40 ml. and cooled. Four grams of hydroxylamine hydrochloride as a reducing agent were added to 40 ml. of 20% chloro-platinic acid as prepared above. The mass was stirred until dissolved, which made a 42.5 ml. of solution containing 0.0943 gram Pt/ml. solution or 0.0768 gram Pt/gram solution.

A 3" x 5" x .005" sheet of the prepared tantalum was coated with the platinizing solution prepared above with a brush and spread evenly. (Application of excess solution could be detected by puddling of the solution.) The tantalum sheet with the first coat of platinum thereon was placed on a sheet of asbestos mill board and then heated in an oven for one minute at 425° C. The tantalum sheet was then removed from the oven. Five such coatings were applied. The final thermally-reduced platinum-coated tantalum upon cooling showed very little discoloration of the tantalum by oxidation and furthermore no noticeable embrittlement during said five coating procedures. Each coat was found to average about 3.3 grams of platinizing solution, therefore (3.3) (.0768)=0.25 gram Pt/coat. The five coats deposited about 1.25 grams of platinum on the electrode surface, which was about 1640 cm.² in area.

$$\frac{1.25}{1640} = 0.76 \text{ milligram platinum/cm.}^2$$

This electrode was installed in an electrolytic cell as an anode which was fed with sea water generating both chlorine and oxygen at a total density of 50 amps. per square foot over a period of ten months with no significant attack of the electrode and with substantially constant voltage requirement at this current density. Furthermore, no stripping of the platinum was apparent.

Example 2

A 3" x 4" piece of tantalum metal was scoured, water washed, and dried. It was then platinized by painting thereon three successive coats of a solution of about 2 parts of ether to 1 part alcohol containing 3% platinic chloride and about 20 drops of oil of lavender. After each coat had dried, the coated tantalum was oven fired at about 500° C. A visible grayish film of platinum was formed by this operation. The platinum solution was applied to the tantalum surface with a hair brush, and if properly thinned may be applied by spraying. At room temperature the platinum coating dried within an hour sufficiently to be handled with care. The drying time may be reduced by passing the coated tantalum through a warm zone. This electrode was then used to pass 10 amperes at a voltage of ten volts in natural sea water for a period of 100 hours without visible attack of the electrode material. (A similar piece of uncoated tantalum would not pass 1 ampere even at a voltage of 100 volts in an identical cell for more than a fraction of a minute.)

Example 3

A 9" x 10" sheet of cleaned tantalum was provided with five coats of a solution of chloroplatinic acid in an ether solvent, and fired in an open reducing flame at about 500° C. after each coat. A mirror-like conductive thin film of platinum was produced on the surface of the tantalum. After operation for 1,000 hours at 10 amperes in an electrolyte of brackish water containing 2,000 p.p.m. chloride ions, 2,000 p.p.m. sulphate ions, and 500 p.p.m. of bicarbonate ions as anionic constituents, the anode showed only a very slight attack. The surface was then cleaned with steel wool, a fresh coat of platinum solution put on the tantalum as before and operation continued as well as it did with the first coat.

The same procedures noted above were effected using titanium and columbium as the base metal with similar results.

This case is a continuation-in-part of copending application, Serial No. 713,556, filed on February 6, 1958, which, in turn, is a continuation-in-part of application, Serial No. 419,621, filed on March 29, 1954, both applications now abandoned.

The above description and examples are intended to be illustrative only. Any modification of or variation therefrom conforms to the spirit of the invention and is intended within the scope of the claims.

What is claimed is:

1. The method of producing a stable anode non-corrosive in the presence of reaction products of electrolysis comprising applying a thin coat of a solution of chloroplatinic acid as a thermally reducible noble metal compound to substantially the entire surface of a base metal of tantalum, heating the same to elevated temperatures of about 500° C. in the presence of hydroxylamine hydrochloride as a reducing agent to cause the noble metal in the solution to be reduced and deposited as a thin film substantially completely coating said base metal.

2. The method of producing a stable anode non-corrosive in the presence of reaction products of electrolysis comprising applying a thin coat of a solution of chloroplatinic acid as a thermally reducible noble metal compound to substantially the entire surface of a base metal of columbium, heating the same to elevated temperatures of about 500° C. in the presence of hydroxylamine hydrochloride as a reducing agent to cause the noble metal in the solution to be reduced and deposited as a thin film substantially completely coating said base metal.

3. The method of producing a stable anode non-corrosive in the presence of reaction products of electrolysis comprising applying a thin coat of a solution of chloroplatinic acid as a thermally reducible noble metal compound to substantially the entire surface of a base metal of titanium, heating the same to elevated temperatures of about 500° C. in the presence of hydroxylamine hydrochloride as a reducing agent to cause the noble metal in the solution to be reduced and deposited as a thin film substantially completely coating said base metal.

References Cited in the file of this patent

UNITED STATES PATENTS

| 1,954,353 | Ernst | Apr. 10, 1934 |
| 2,719,797 | Rosenblatt | Oct. 4, 1955 |
| 2,955,999 | Tirrell | Oct. 11, 1960 |
| 3,006,821 | Haring | Oct. 31, 1961 |

FOREIGN PATENTS

| 569,500 | Belgium | Jan. 16, 1959 |
| 845,043 | Great Britain | Aug. 17, 1960 |